US008042109B2

(12) United States Patent
Johnson et al.

(10) Patent No.: US 8,042,109 B2
(45) Date of Patent: Oct. 18, 2011

(54) FRAMEWORK FOR DOMAIN-SPECIFIC RUN-TIME ENVIRONMENT ACCELERATION USING VIRTUALIZATION TECHNOLOGY

(75) Inventors: Erik J. Johnson, Portland, OR (US); Aaron R. Kunze, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1527 days.

(21) Appl. No.: 11/386,989

(22) Filed: Mar. 21, 2006

(65) Prior Publication Data
US 2007/0226736 A1  Sep. 27, 2007

(51) Int. Cl.
*G06F 9/455* (2006.01)
*G06F 9/46* (2006.01)
(52) U.S. Cl. ............................................. 718/1; 718/100
(58) Field of Classification Search ................. 718/1
See application file for complete search history.

(56) References Cited

U.S. PATENT DOCUMENTS

| | | | |
|---|---|---|---|
| 6,075,938 A | 6/2000 | Bugnion et al. | |
| 7,571,440 B2 * | 8/2009 | Vessey et al. | 719/312 |
| 7,661,104 B2 * | 2/2010 | Watt et al. | 718/100 |
| 2004/0205755 A1 | 10/2004 | Lescouet et al. | |
| 2005/0091652 A1 | 4/2005 | Ross et al. | |
| 2005/0289542 A1 * | 12/2005 | Uhlig et al. | 718/1 |
| 2006/0005186 A1 | 1/2006 | Neil | |
| 2006/0130060 A1 * | 6/2006 | Anderson et al. | 718/1 |
| 2007/0022421 A1 * | 1/2007 | Lescouet et al. | 718/1 |

FOREIGN PATENT DOCUMENTS
WO  2007/109484 A1  9/2007

OTHER PUBLICATIONS

Yaghmour, Karim, "Adaptive Domain Environment for Operating Systems", 2001, Opersys, Inc., pp. 1-7.*
Vmware, Inc., "Virtualization for Business Needs," web page, located at http://www.vmware.com/solutions, 2006.
Intel Corporation, "Intel® Virtualization Technology," web page, located at http://www.intel.com/technology/computing/vptech, 2006.
Intel Corporation, "Enhanced Virtualization on Intel® Architecture-based Servers: Improve Utilization, Manage Change, Reduce Costs," white paper, 12 pages, 2006.
Intel Corporation, "Consolidation Strategies for Intel® Processor-based Servers: Achieving Better Datacenter Flexibility and Cost-effectiveness with Intel® Virtualization Technology," white paper, 16 pages, Feb. 2006.
Intel Corporation, "Intel® Virtualization Technology for Directed I/O Architecture Specification," Document No. D51397-001, 106 pages, Feb. 2006.

(Continued)

*Primary Examiner* — Kenneth Tang
(74) *Attorney, Agent, or Firm* — Joni D. Stutman

(57) ABSTRACT

In some embodiments, the invention involves a framework for using virtualization technology to efficiently support a domain-specific run-time environment. In at least one embodiment, a framework is utilized to take advantage of virtualization technology (VT) to partition performance critical and non-performance critical tasks of the same domain-specific application. An embodiment of the invention utilizes a general-purpose operating system to execute non-performance critical aspects of a domain, and uses a privileged VT-root mode to execute performance critical aspects of the domain. Another embodiment uses one or more guest VMs to execute the performance critical aspects of the domain-specific run-time environment. Other embodiments are described and claimed.

22 Claims, 7 Drawing Sheets

OTHER PUBLICATIONS

Intel Corporation, "Intel® Virtualization Technology Specification for the IA-32 Intel® Architecture," Document No. C97063-002, 144 pages, Apr. 2005.

Intel Corporation, "Intel® Virtualization Technology Specification for the Intel® Itanium® Architecture (VT-i)," Revision 2.0, Document No. 305942-002, 100 pages, Apr. 2005.

Paul Barham et al., "Xen and the Art of Virtualization," Proceedings of the 19th ACM Symposium on Operating Systems Principles (Bolton Landing, NY), pp. 164-177, Oct. 2003.

Rich Uhlig et al., "Intel Virtualization Technology", Computer, IEEE Computer Society, vol. 38, No. 5, pp. 48-56, May 2005.

International Preliminary Report on Patentability received for PCT Application No. PCT/US2007/064020, mailed on Oct. 2, 2008, 6 pages.

International Search Report and Written Opinion Received for PCT Patent Application No. PCT/US2007/064020, mailed on Jul. 24, 2007, 10 pages.

Office Action received for Chinese Patent Application No. 200780009841.7, mailed on Mar. 12, 2010, 9 pages of Chinese Office Action, including 4 pages of English translation.

"Virtualization:Concepts, applications, and performance modeling", George Mason University, 2005, XP002584933, 7 pages.

European Search Report received for European Patent Application No. 07758562.8, mailed on Jul. 1, 2010, 6 page.

Office Action received for Chinese Patent Application No. 200780009841.7, mailed on Dec. 2, 2010, 7 pages of Chinese Office Action, including 4 pages of English translation.

* cited by examiner

FRAMEWORK FOR DOMAIN-SPECIFIC RUN-TIME ENVIRONMENT ACCELERATION USING VIRTUALIZATION TECHNOLOGY

FIELD OF THE INVENTION

An embodiment of the present invention relates generally to computing environments using virtualization technology, and more specifically, to a framework for using virtualization technology to efficiently support a domain-specific run-time environment.

BACKGROUND INFORMATION

Various mechanisms exist for implementing virtual machines in a single platform. A class of software known as virtual machine monitors (VMMs) enables a single platform/processor to simultaneously support multiple guest operating systems. Intel® Corporation's Virtualization Technology (VT) enables the efficient execution of VMMs on Intel® Architecture (IA) processors (and eventually platforms).

In VT environments, guest operating systems (OSs) are each provided a "virtual machine" (VM) view of the processor and platform and the guest OS is typically unaware that it is not controlling all of the processor or platform resources. The motivations for utilizing VMMs have included consolidation of physical hardware (e.g., one hardware platform consolidates the software previously executed on multiple physical platforms) and resource partitioning for any combination of manageability, security, and quality reasons (e.g., a platform hosting multiple guests can use a VMM to provide isolation and better service to those hosted applications which pay higher fees).

Intel® Corporation's Virtualization Technology (VT) environments enable creation of a new "higher" (more-privileged) privilege level, called "root mode", which enables the VMM software to control processor and platform resources and present a view of the hardware resources to existing guest operating systems that the guest OS is in control.

Currently, VT is used to create VMM software that schedules and isolates the execution of multiple guest operating systems. The computational model is that both performance-critical and non-performance critical code for a domain or application is run in the same guest operating system (VT non-root mode) and the software in VT root mode is only there to ensure isolation and fairness between the guest operating systems.

As has been noticed by industry practitioners, there have been performance issues with using general-purpose platforms to be used as embedded, or domain-specific, devices such as networking devices. Types of devices may include intrusion detection or XML acceleration, but may apply to other domains, as well. The problems relate to applications that need access to services from a general-purpose operating system (GPOS), for instance Linux®, BSD®, or BSD-variants like FreeBSD®, NetBSD®, or OpenBSD, Windows®. Performance of such domain-specific applications running under the general-purpose OSs tends to be poor. For network devices in particular, problems included too many interrupts or a large number of buffer copies. To counteract this, vendors have made significant modifications to the general-purpose OS to accommodate the networking applications. In other words, vendors have gotten around the problem by implementing customized domain-specific run-time environments (DSRTE) tightly integrated with the GPOS. These platforms are very difficult to maintain. When an update to the general-purpose OS was made, it often had a "domino" effect requiring changes to the DSRTE. Some changes to the GPOS may be modifications to kernel modules, similar to a dynamic link library (dll) for the kernel module, but also changes to the scheduler or network stack. Non-dll modifications, or direct changes to the GPOS, are extremely difficult to maintain when the GPOS is updated or modified.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to domain-specific run-time environments. In at least one embodiment, the present invention is intended to utilize a framework for a different usage of virtualization technology (VT) than is used in existing systems. Instead of supporting multiple guest operating systems, embodiments of the present invention describe a framework for using VT to efficiently support a domain-specific run-time environment (DSRTE), as are often found in embedded systems for specific domains like networking devices, while maintaining transparency to both the application and existing general-purpose operating system. Embodiments of a run-time environment allow performance-critical portions of applications executing in the DSRTE to run in the privileged VT-root mode of an Intel® Architecture (IA) processor or in a separate VM that has special privileges appropriate for the particular domain. The application and operating system (OS) are unaware of this change; hence when OS services are required the services are still available, but the run-time environment may now control the processor and platform resources in a manner tuned to its particular domain. This method is difficult, or sometimes impossible, with a general-purpose operating system (GPOS). Embodiments of the present invention expand the reach of virtualization technology into domains not currently well suited by the general purpose nature of Intel® Architecture (IA) and the general-purpose operating systems which currently run on IA. Other platform architectures may benefit, as well.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
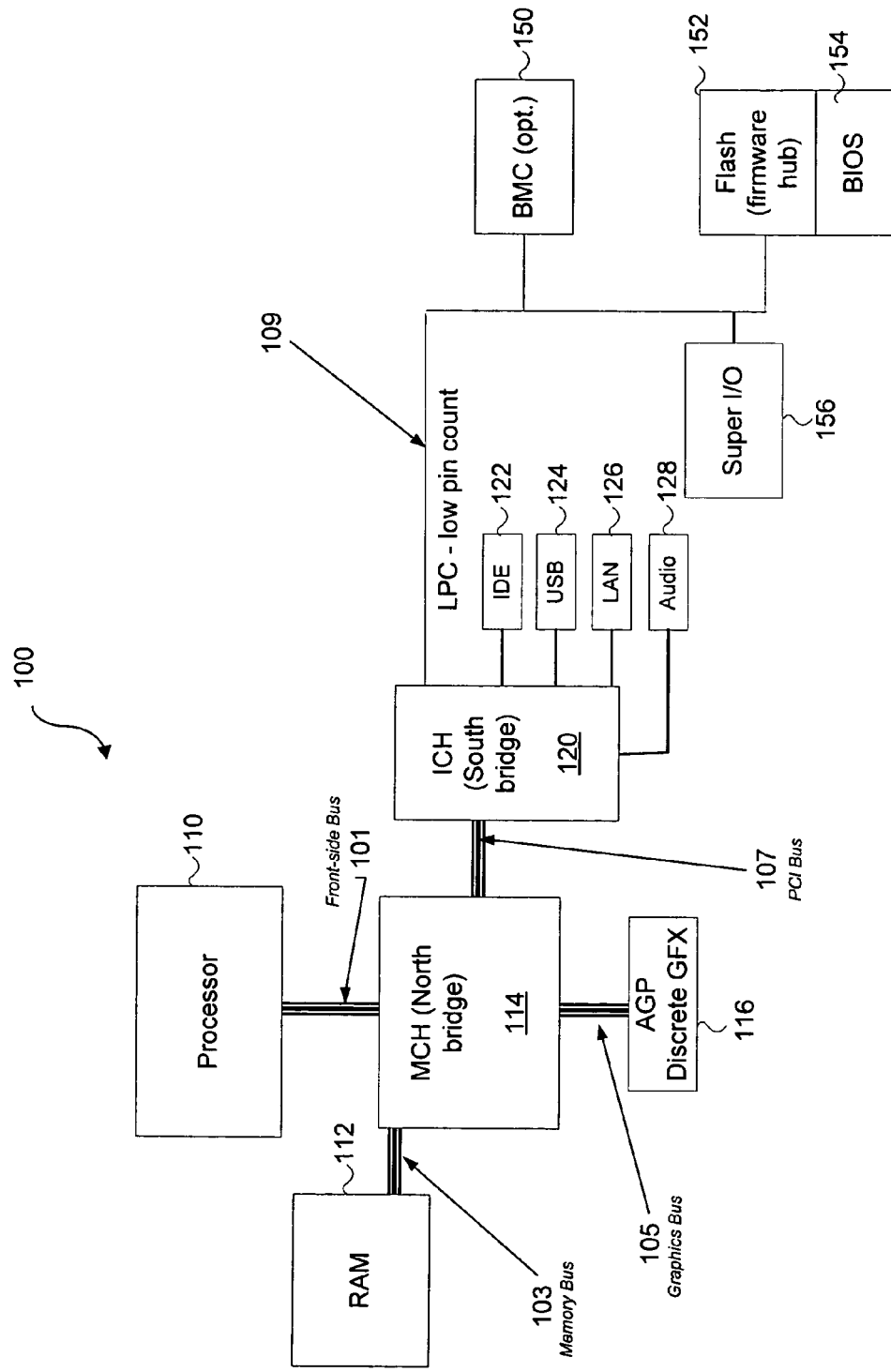
FIG. 1 is a block diagram of an exemplary platform on which embodiments of the present invention may be implemented.

FIG. 1 is a block diagram of an exemplary platform on which embodiments of the present invention may be implemented. Processor 110 communicates with a memory controller hub (MCH) 114, also known as North bridge, via the front side bus 101. The MCH 114 communicates with system memory 112 via a memory bus 103. The MCH 114 may also communicate with an advanced graphics port (AGP) 116 via a graphics bus 105. The MCH 114 communicates with an I/O controller hub (ICH) 120, also known as South bridge, via a peripheral component interconnect (PCI) bus 107. The ICH 120 may be coupled to one or more components such as PCI hard drives (not shown), legacy components such as IDE 122, USB 124, LAN 126 and Audio 128, and a Super I/O (SIO) controller 156 via a low pin count (LPC) bus 156.

Processor 110 may be any type of processor capable of executing software, such as a microprocessor, digital signal processor, microcontroller, or the like. Though FIG. 1 shows only one such processor 110, there may be one or more processors in platform hardware 100 and one or more of the processors may include multiple threads, multiple cores, or the like.

Memory 112 may be a hard disk, a floppy disk, random access memory (RAM), read only memory (ROM), flash memory, or any other type of medium readable by processor 110. Memory 112 may store instructions for performing the execution of method embodiments of the present invention.

Non-volatile memory, such as Flash memory 152, may be coupled to the IO controller via a low pin count (LPC) bus 109. The BIOS firmware 154 typically resides in the Flash memory 152 and boot up will execute instructions from the Flash, or firmware.

In some embodiments, platform 100 is a server enabling server management tasks. This platform embodiment may have a baseboard management controller (BMC) 150 coupled to the ICH 120 via the LPC 109.

Figure 2:
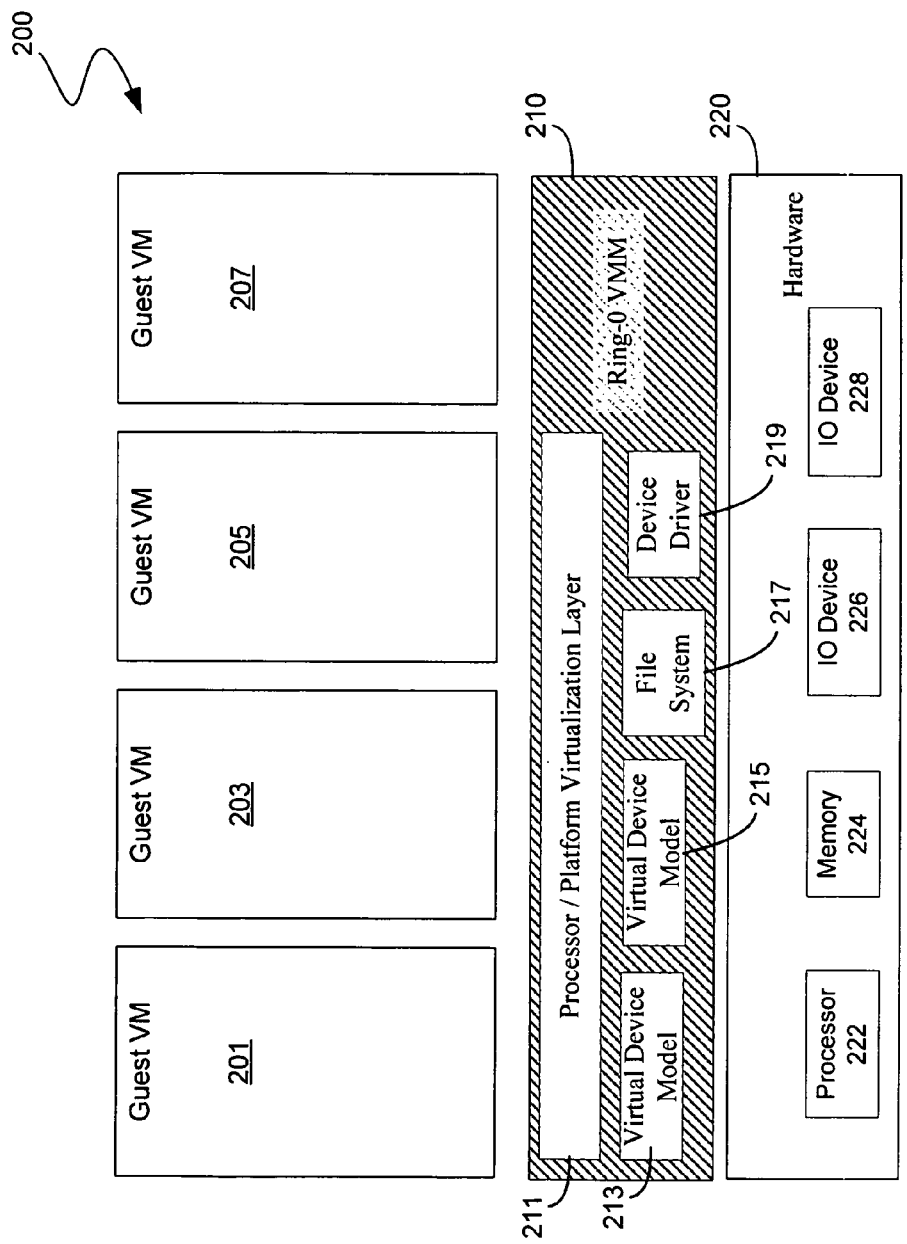
FIG. 2 is a block diagram illustrating traditional hypervisor virtual machine monitor (VMM) architecture platform, according to embodiments of the invention.

FIG. 2 is a block diagram illustrating traditional hypervisor VMM architecture platform 200. A number of guest VMs 201, 203, 205, and 207 may be running on the platform 200 at the same time. A virtual machine monitor (VMM) 210 controls the guest VMs' access to the hardware 220 via the processor/platform virtualization layer 211. A number of virtual device models 213 and 215 may exist within the VMM 210. The VMM 210 may operate at the highest privilege level. The VMM 210 controls access to the file system, memory and all devices, as discussed further below. The VMM 210 typically has a device driver 219 for each hardware device on the platform.

The VMM 210 and guest VMs 201, 203, 205 and 207 execute on platform hardware 220. The platform hardware 220 may include a processor 222, memory 224 and one or more I/O devices 226 and 228. The platform hardware 220 may be a personal computer (PC), mainframe, handheld device, portable computer, set top box, or any other computing system.

Processor 222 may be any type of processor capable of executing software, such as a microprocessor, digital signal processor, microcontroller, or the like. Though FIG. 2 shows only one such processor 222, there may be one or more processors in platform hardware 220 and one or more of the processors may include multiple threads, multiple cores, or the like.

Memory 224 may be a hard disk, a floppy disk, random access memory (RAM), read only memory (ROM), flash memory, or any other type of medium readable by processor 222. Memory 224 may store instructions for performing the execution of method embodiments of the present invention.

The one or more I/O devices 226 and 228 may be, for example, network interface cards, communication ports, video controllers, disk controllers on system buses (e.g., Peripheral Component Interconnect (PCI), Industry Standard Architecture (ISA), Advanced Graphics Port (AGP)), devices integrated into the chipset logic or processor (e.g., real-time clocks, programmable timers, performance counters), or any other device on the platform hardware 220. The one or more I/O devices 226 and 228 may be accessed through I/O instructions, or memory mapped I/O accesses or through any other means known in the art.

Figure 3B:
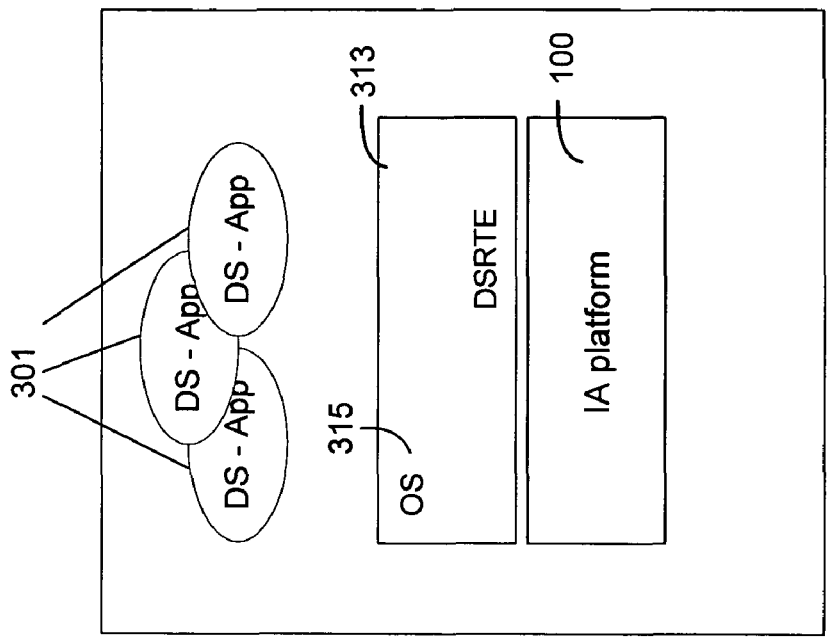
FIGS. 3A-B are block diagrams illustrating options for domain-specific run-time environment architectures.
Figure 3A:
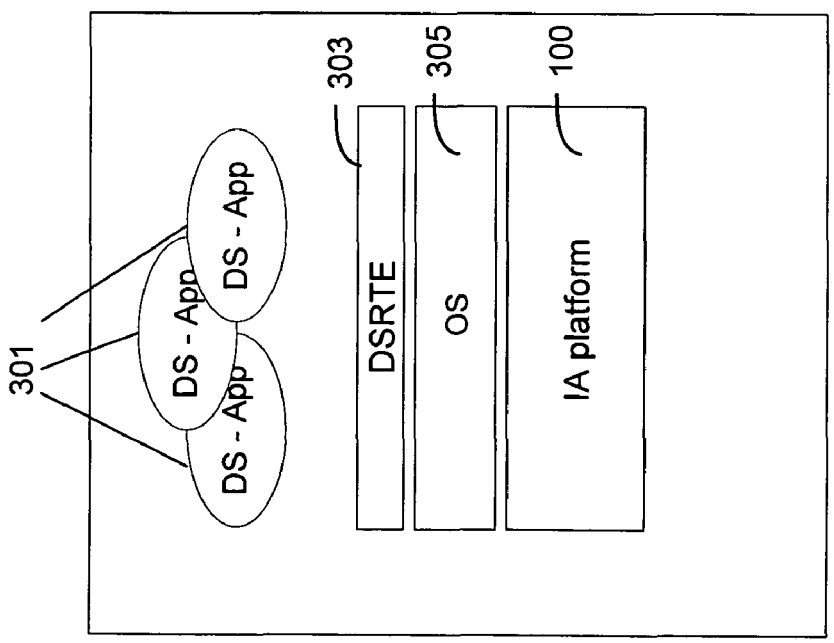

FIGS. 3A-B are block diagrams illustrating options for domain-specific run-time environment architectures. Domain-specific applications (DS-App) 301 and run-time environments 303 require some services from an operating system (OS) 305. For best performance, the domain-specific application needs control of other aspects of the platform 100. For example, embedded packet processing systems may benefit from custom packet-aware schedulers, memory managers, and network interface card (NIC) servicing (I/O servicing). Occasionally, access to a file-system may be necessary, also.

A first option for a domain-specific run-time environment architecture is shown in FIG. 3A. The domain-specific run-time environment (DSRTE) 303, on a platform 100, executes on top of an existing OS 305 and its applications. This method often performs poorly, as the assumptions of a GPOS are not typically appropriate for an environment such as a network packet processing environment. For example, general-purpose operating systems use interrupts to communicate between network devices and the CPU, and paging is used to manage virtual memory. These techniques provide little benefit and may exhibit significant performance degradation to packet processing applications.

Another option for a DSRTE architecture is shown in FIG. 3B. Here the DSRTE 313 is tightly-coupled with the OS 315. While this provides the domain-specific performance and control aspects to the DSRTE and its applications, it has the undesirable cost of extra testing and maintenance of the modified OS. This method also prevents the use of a closed-source GPOS, which may not offer enough control to achieve this tight coupling.

In the following discussion, a network packet processing domain is used to illustrate embodiments of the invention. It will be apparent to one of ordinary skill in the art that any domain-specific run-time which is currently limited by the general purpose nature of existing operating systems could fit within the invention framework.

In one embodiment, the platform may be split into two domains. In one domain resides the unmodified GPOS with code/modules needing the services of the GPOS, the code/modules being selected by the vendor. These modules are typically non-performance critical processes, for instance, occasional access to a hard drive or USB port, or access to a GUI. The other domain may contain the performance critical processes which may "run on the bare metal." In other words, there are few layers between the processes and the hardware itself. For purposes of this discussion, one domain is referred to as VT-root mode and the other is non-VT-root mode. Performance critical tasks will run in VT-root mode. In alternative embodiments, performance critical tasks may run in one non-VT-root VM and non-performance critical tasks may run in another non-VT-root VM with a VMM in VT-root mode controlling the two VMs.

Figure 4:
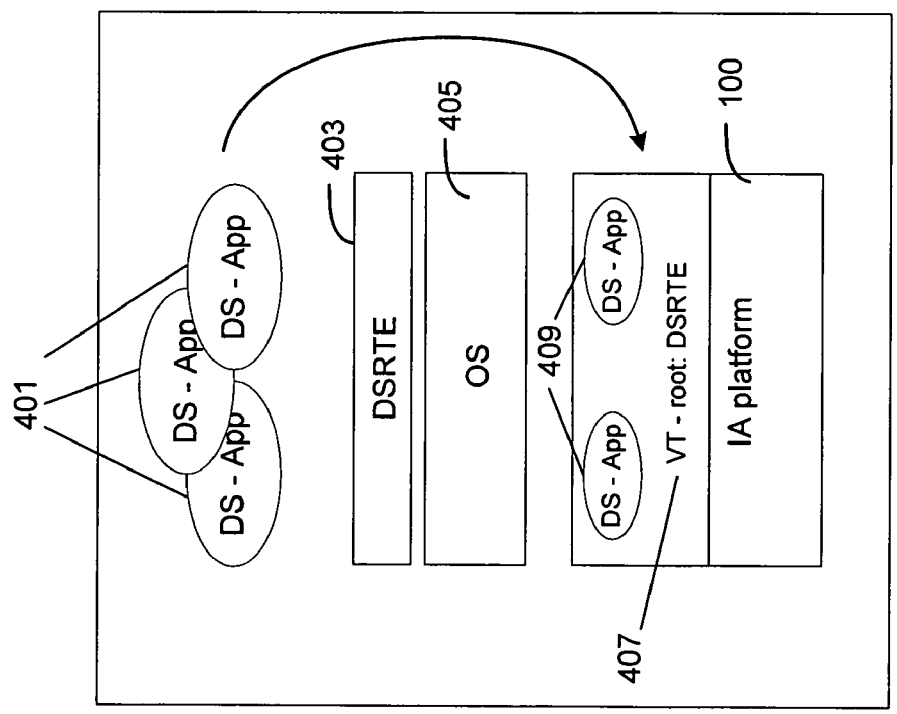
FIG. 4 is a block diagram illustrating a framework for executing a DSRTE that has both control of platform resources (processors, memory, I/O) and co-exists with an unmodified general-purpose OS, according to embodiments of the invention.

Referring now to FIG. 4, there is shown a block diagram illustrating a framework for executing a DSRTE that has both control of platform resources (processors, memory, I/O) and co-exists with an unmodified general-purpose OS (GPOS), according to embodiments of the invention. The OS 405 may run in a guest virtual machine (VM) 201 and be unaware that the DSRTE 403 running in guest VM 203 is actually in control of the platform resources such as scheduling, memory management, and I/O, and yet the domain-specific run-time can defer to the guest OS (201) when its applications 401 require non-performance critical services. In embodiments of the invention, the DSRTE 403 still presents a view that the application 401 is executing on top of a DSRTE 403 which is in turn on top of an OS 405. However, in embodiments, the domain specific applications (DS-App) 401 execute the non-performance critical tasks. The performance critical tasks of the DS-App are executed in the VT-root DSRTE 407, as shown by ovals 409. The DS-Apps 409 in VT-root mode 407 communicate with the DS-Apps 401 running in the GPOS portion of the DSRTE 403.

However, the DSRTE 403 may run performance-critical portions of its applications in VT-root mode and begin to execute these applications 401 in a manner optimized for the domain of the application. When the application 401 requests OS services not supported by the VT-root portion 407 of the DSRTE 403, the guest OS 201/203 is scheduled and allowed to service the request. In one embodiment, VT-root mode 407 is the primary execution environment of the application and a single guest OS is used to expand the set of services provided to the application. This invention is transparent to the existing applications and the OS.

Figure 5:
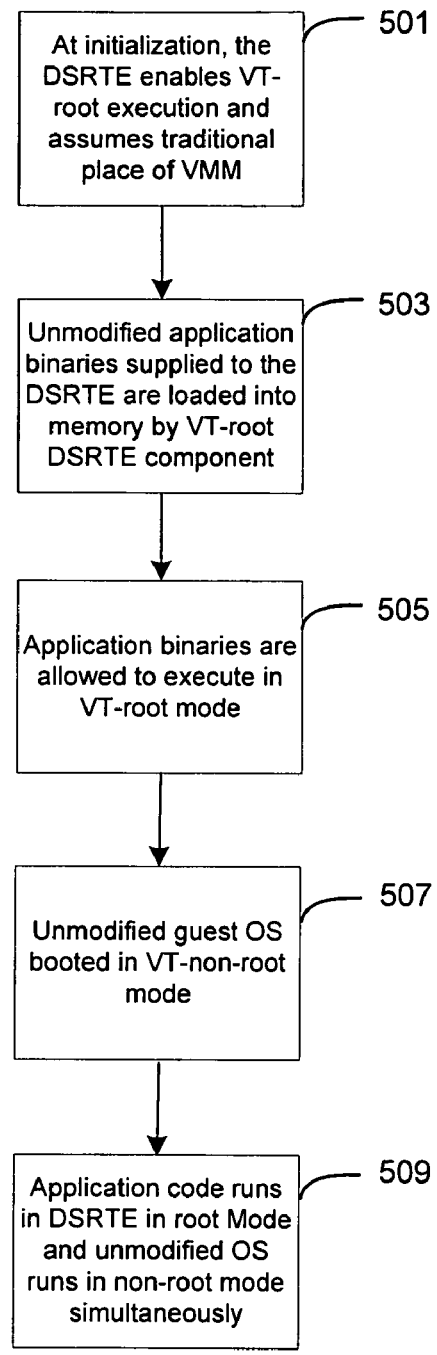
FIG. 5 is a flow diagram illustrating a method for implementing an efficient domain-specific run-time environment (DSRTE) using virtualization, according to an embodiment of the invention.

FIG. 5 is a flow diagram illustrating a method for implementing an efficient domain-specific run-time environment (DSRTE) using virtualization, according to an embodiment of the invention. In an embodiment of the invention, at initialization, the DSRTE may enable a VT-root execution and assume the traditional place of a virtual machine monitor (VMM), in block 501. Unmodified application binaries may be supplied to the DSRTE and loaded into memory by the VT-root DSRTE component, in block 503. The application binaries may be allowed to execute in the VT-root mode, in block 505. Then, an unmodified GPOS may be loaded and run in non-VT-root mode, in block 507, allowing the non-performance critical components of the application to run. The performance critical parts of the application may then run in VT-root mode at the same time as the non-performance critical parts of the application that are running under the GPOS in the non-VT-root mode, as in block 509. Based on the description herein, it will be apparent to one of skill in the art that this may be achieved in a number of ways. In one embodiment, the different parts of the application run simultaneously via time-sharing. In another embodiment, the different parts of the application are run on different processor contexts, threads, or cores.

In one implementation for a wireless router, for instance, processes running on the router may run in two domains. A GUI interface for controlling the router settings may be run in the non-VT-root (non-performance critical) domain. Network packet communication and processing may run in the VT-root (performance critical) domain. It will be apparent to one of skill in the art that various techniques may be used for communication between the two domains. For instance, in virtualization technology, mailboxes, shared memory, or a software mechanism to send network packets between the two domains may be utilized in different implementations. Some techniques for passing information between VMs may be found in conjunction with Xen, which is an Enterprise-Grade Open Source Virtualization application, on the public Internet at URL www.xensource.com. Other information related to virtualization technology may be found at www.intel.com/cd/ids/developer/asmo-na/eng/dc/enterprise/technologies/197668.htm.

When an operation or event occurs while executing a VM in non-VT-root mode that has special significance, the processor may jump to VT-root mode. In VT terminology, this may be referred to as a VM-EXIT (exit from a VM). When the root domain finishes processing the special case, control may be transferred back to the previously executing VM, with a VM-ENTER.

For instance, in an embodiment for network packet switching, the large majority of packets may be handled by the DSRTE, whether it be in a VT-root domain or specialized VM. Thus, communication with the GPOS VM will be minimal, and performance critical operations remain in the DSRTE.

Figure 6:
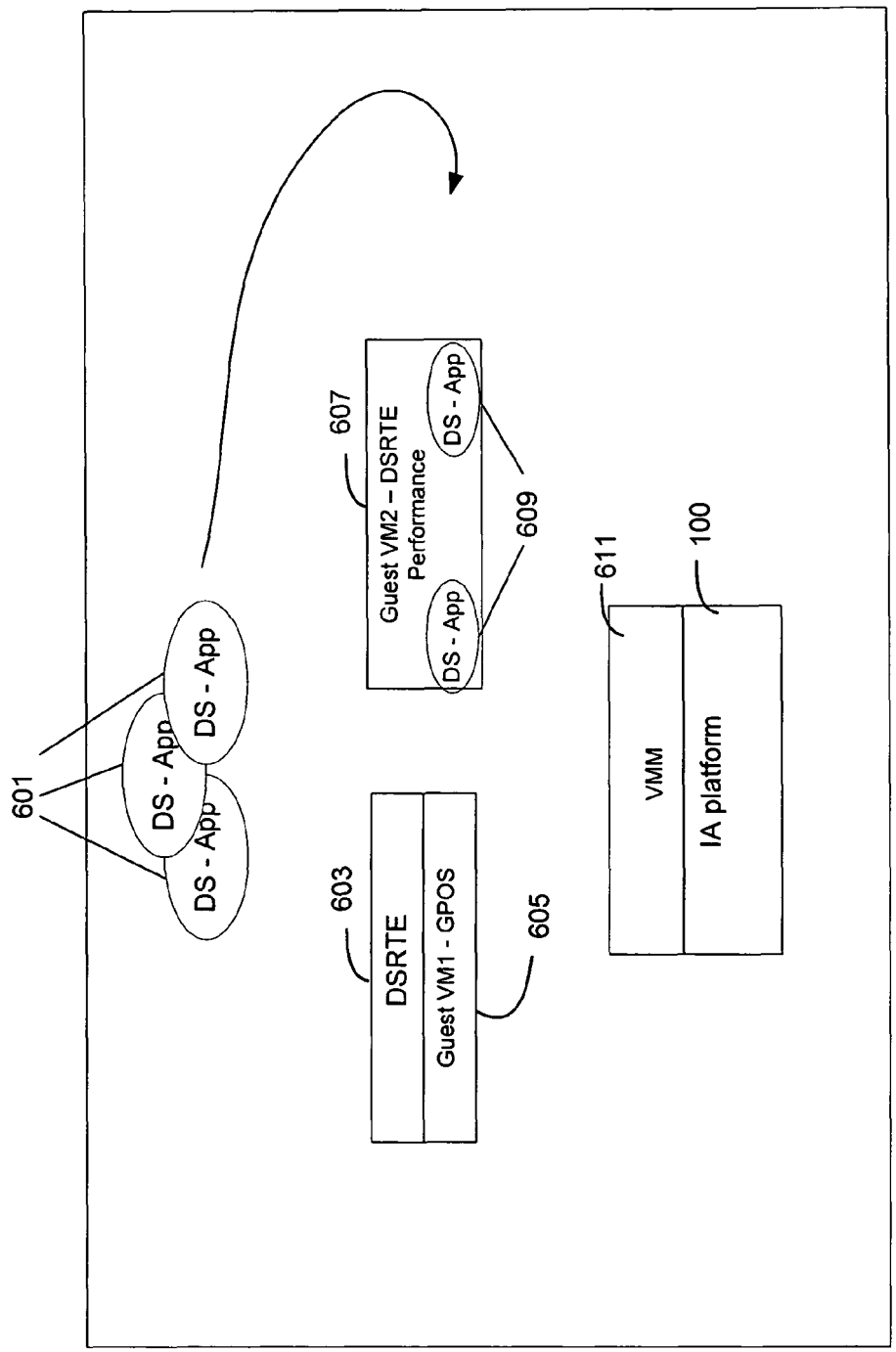
FIG. 6 is a block diagram illustrating a framework for executing a DSRTE that uses multiple guest VMs to partition tasks of one application, according to an embodiment of the invention.

In some embodiments, the VMM is minimized to enable the performance critical tasks to access I/O drivers/devices directly, or with little overhead. As discussed above, in one embodiment, the DSRTE is part of the VMM and in another embodiment, the DSRTE is part of a guest OS/guest VM. Referring to FIG. 6, a VMM 611 operates in VT-root mode on the platform 100. A GPOS executes in a guest VM 605. One or more DS-Apps 601 execute within the GPOS guest VM in a DSRTE 603. However, performance critical aspects of the DS-Apps 609 are actually performed by a second guest VM 607. Control may pass to the second guest VM 605 via a VM-EXIT through the VMM 611 caused by the DS-App 601 running in the first guest VM 607. In this embodiment, the VMM 611 determines that control should be transferred to the performance critical DS-App portion in the second guest VM. Also, the portions of the application that are running on different partitions may communicate with each other via shared memory or message passing.

In another embodiment, at least one additional guest VM may run on the platform that is unrelated to the DSRTE. In this case the additional guest VM may perform either performance critical or non-performance critical tasks unrelated to the DSRTE. In yet another embodiment, the DSRTE may require several various performance critical tasks. Each of these tasks may run in its own guest VM, in for instance, the non-VT-root embodiment (FIG. 6). For instance, an embedded device with many I/O ports, each port may be configured to perform a different function. Each port's activities may be deemed to be performance critical and their performance critical DSRTE may operate in their own guest VM.

While the above description has been illustrated with a network communication example, embodiments of the present invention may be adapted to be used with a variety of applications. Applications that exhibit a noticeable difference between performance critical and non-performance critical aspects of the application may be good candidates for using this method. For instance, in a set-top box environment, the coding and decoding of audio-visual streams may be performed in the performance critical DSTRE and the user interface or download of program guides or update of software may be performed in the GPOS VM.

In another embodiment, the I/O devices are polled for activity rather than relying on interrupts. This may increase performance. Page faults are expensive, so virtual memory facilities may be disabled for the performance critical code. The performance critical DSRTE may perform better when accessing devices directly. Therefore, in embodiments where the performance DSRTE runs in a guest VM rather than in VT-root mode, the guest VM will need to know the memory address offset to the devices to properly access them directly. The PCI devices are memory mapped into physical space. Communication between the two domains may be necessary to effect this requirement.

Figure 7:
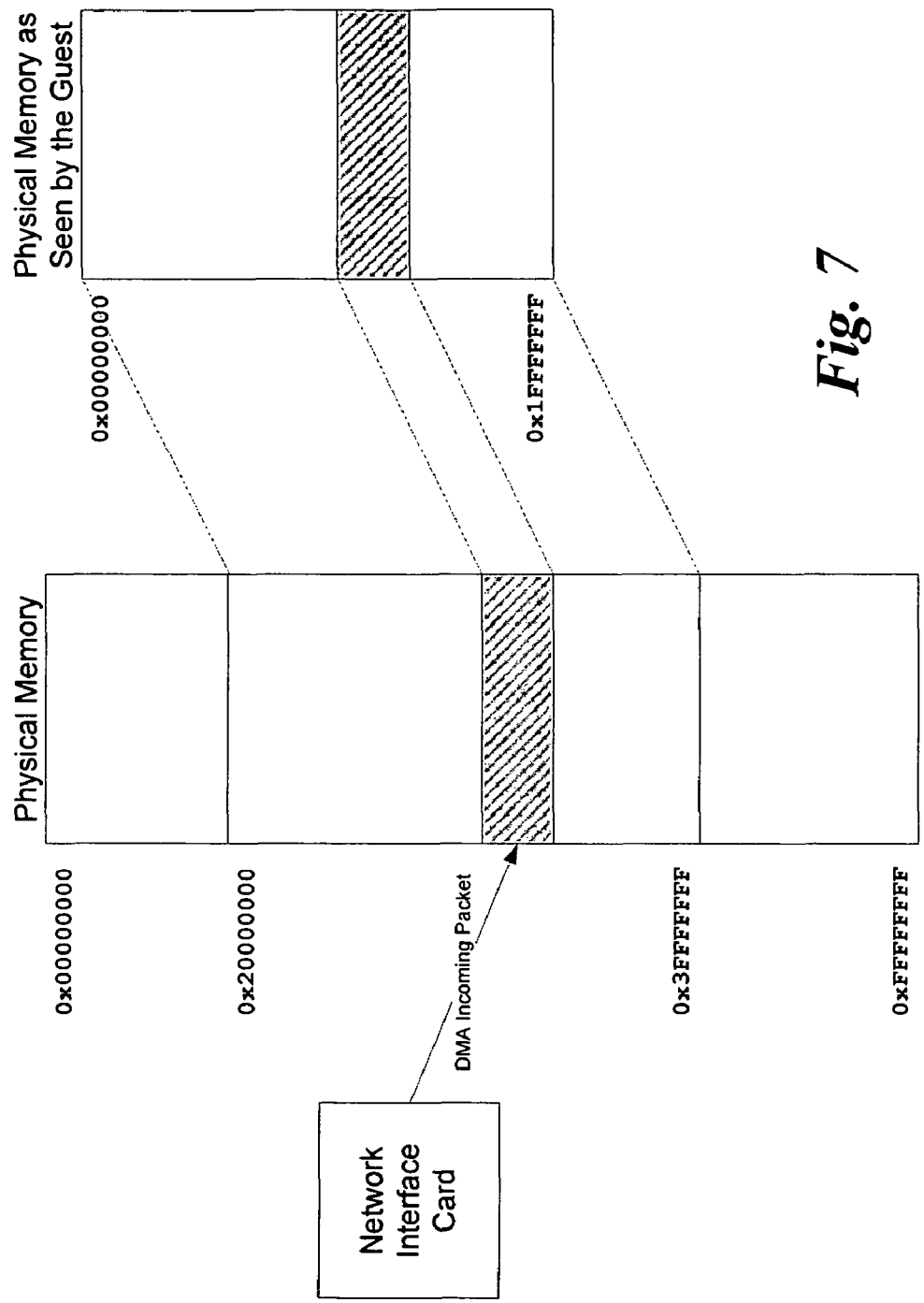
FIG. 7 is a block diagram of memory mapping as may be used by an embodiment of the invention.

Referring to FIG. 7, there is shown a block diagram illustrating a memory map. When the performance critical DSRTE portion is run in non-root mode, the guest operating system (guest VM) believes it controls a chunk of physical memory starting at address 0x00000000, when in fact it only has a portion of the system's actual physical memory, starting at some offset decided by the VMM running in VT-root mode. VMMs that use VT have mechanisms must ensure that the page tables set up by the guest VM are set up to point to the correct regions of physical memory instead of the physical memory as seen by the guest. For example, if the guest OS sets up the page table to map virtual address 0x40000000 to physical address 0x10000000 (using the mappings above), the VMM will correct this in the page table so that virtual address 0x40000000 actually maps to physical address 0x30000000. This is transparent to the guest OS. This technique handles any memory reads/writes performed by the guest OS. But I/O devices such as the Network Interface Card (NIC) also read and write physical memory using Direct Memory Access (DMA). Without any virtualization, the OS would notify the NIC of the physical address of where it should put an incoming packet. With virtualization, this is complicated by the fact that the guest operating system does not typically know the actual physical offset of its view of physical memory. So the guest OS does not know where to tell the NIC to DMA an incoming packet. In the environment described above, however, the performance critical DSRTE has knowledge of being run in a virtualized environment. Thus, the DSRTE may use this knowledge to its advantage. With the addition of a VMCALL to the VMM to ask for its physical memory offset, the guest OS may compute and notify the NIC of the correct physical address of where to DMA an incoming packet.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
a platform having virtualization capabilities;
at least one processor coupled to the platform, the at least one processor to run a general-purpose operating system (GPOS) in a first virtual machine (VM) on the platform;
a domain specific run-time environment (DSRTE) partitioned into at least two portions, wherein a first portion comprises non-performance critical processes to run under the GPOS in the first VM, and wherein at least one additional portion comprises at least one performance critical process to run on the platform outside of the first VM running the GPOS; and
a privileged root domain, wherein the at least one performance critical process is to run in the privileged root domain,
wherein the privileged root domain comprises a domain specific run-time environment customized to execute the at least one performance critical process, wherein the GPOS comprises a GPOS that is not customized to execute the at least one performance critical process.

2. The system as recited in claim 1, further comprising:
the privileged root domain further comprising a virtual machine monitor (VMM) to control each VM on the platform, wherein at least one performance critical process is to run in a second virtual machine, where the second VM is non-privileged VM.

3. The system as recited in claim 2, wherein the first VM and the second VM communicate via at least one communication method selected from the group of communication methods consisting of mailboxes, shared memory, and network packets.

4. The system as recited in claim 1, further comprising:
at least one additional virtual machine to run one or more processes, wherein each of the one or more processes comprise one of a performance critical process and a non-performance critical process.

5. The system as recited in claim 1, wherein the privileged root domain is to be entered in response to a VM-EXIT event, and is to return control to a VM in response to a VM-ENTER event, and wherein initiating a performance critical task is to generate a VM-EXIT from the GPOS in the first VM.

6. A computer implemented method comprising:
partitioning a domain specific run-time environment (DSRTE) into at least two partitions, a first partition comprising non-performance critical tasks to run under a general-purpose operating system (GPOS) in a virtual machine (VM) and at least one additional partition comprising performance critical tasks, the DSRTE to reside on a platform having virtualization capabilities;
generating an Exit to a privileged root domain from the first partition, in response to an event for executing a performance critical task;
executing the performance critical task in the at least one additional partition; and
returning control to the first partition in response to an Enter event,
wherein the platform comprises a set-top box environment, and the performance critical tasks include coding and decoding of audio-visual streams.

7. The method as recited in claim 6, wherein the at least one additional partition comprises two or more partitions, each of the two or more partitions to run a performance critical operation corresponding to a specific input/output (I/O) device.

8. The method as recited in claim 6, wherein the performance critical tasks include a network communication task.

9. The method as recited in claim 6, wherein the non-performance critical tasks include a user interface, and the performance critical tasks include network packet communication.

10. The method as recited in claim 6, wherein the at least one additional partition comprises a privileged root domain running on the platform.

11. The method as recited in claim 6, wherein the at least one additional partition comprises at least one additional corresponding non-privileged VM, wherein a privileged virtual machine monitor (VMM) controls the execution of each VM on the platform.

12. A computer implemented method comprising:
partitioning a domain specific run-time environment (DSRTE) into at least two partitions, a first partition comprising non-performance critical tasks to run under a general-purpose operating system (GPOS) in a virtual machine (VM) and a second partition comprising performance critical tasks, the DSRTE to reside on a platform having virtualization capabilities; and
executing the performance critical tasks in the second partition further comprising a privileged execution environment, wherein the first partition is used to expand a set of services provided to the DSRTE,
wherein the privileged execution environment comprises a domain specific run-time environment customized to execute the at least one performance critical task, wherein the GPOS comprises a GPOS that is not customized to execute the at least one performance critical task.

13. The method as recited in claim 12, wherein the at least two partitions further comprises a third partition comprising a second non-privileged virtual machine (VM).

14. The method as recited in claim 12, further comprising:
entering the first partition when the performance critical tasks need a service of the GPOS; and
exiting to the second partition to continue processing performance critical tasks.

15. A non-transitory machine readable medium having instructions that when executed cause the machine to:
execute a domain specific run-time environment (DSRTE) having at least two partitions, wherein a first partition of the domain specific run-time environment (DSRTE) comprises non-performance critical tasks to run under a general-purpose operating system (GPOS) in a virtual machine (VM), and wherein at least one additional partition comprises performance critical tasks, and wherein the DSRTE is to reside on a platform having virtualization capabilities;
generate an Exit to a privileged root domain from the first partition, in response to an event for executing a performance critical task;
execute the performance critical tasks in the at least one additional partition; and
return control to the first partition in response to an Enter event, wherein the platform comprises a set-top box environment, and the performance critical tasks include coding and decoding of audio-visual streams.

16. The medium as recited in claim 15, wherein the at least one additional partition comprises two or more partitions, each of the two or more partitions to run a performance critical operation corresponding to a specific input/output (I/O) device.

17. The medium as recited in claim 15, wherein the performance critical task comprises a network communication task.

18. The medium as recited in claim 15, wherein the non-performance critical tasks include a user interface, and the performance critical tasks include network packet communication.

19. The medium as recited in claim 15, wherein the at least one additional partition comprises a privileged root domain running on the platform.

20. The medium as recited in claim 15, wherein the at least one additional partition comprises at least one additional corresponding non-privileged VM, wherein a privileged virtual machine monitor (VMM) controls the execution of each VM on the platform.

21. A non-transitory machine readable medium having instructions that when executed cause the machine to:

partition a domain specific run-time environment (DSRTE) into at least two partitions, a first partition comprising non-performance critical tasks to run under a general-purpose operating system (GPOS) in a virtual machine (VM) and a second partition comprising performance critical tasks, the DSRTE to reside on a platform having virtualization capabilities; and execute the performance critical tasks in the second partition further comprising a privileged execution environment, wherein the first partition is used to expand a set of services provided to the DSRTE, wherein the privileged execution environment comprises a domain specific run-time environment customized to execute the at least one performance critical task, wherein the GPOS comprises a GPOS that is not customized to execute the at least one performance critical task.

22. The medium as recited in claim 21, further comprising instructions to:

enter the first partition when the performance critical tasks need a service of the GPOS; and exit to the second partition to continue processing performance critical tasks.

* * * * *